United States Patent
Nast et al.

(10) Patent No.: US 7,133,652 B2
(45) Date of Patent: Nov. 7, 2006

(54) CIRCUIT ARRANGEMENT FOR COMPENSATION OF THE DAMPING IN AN ANTENNA FEED CABLE FOR A MOBILE RADIO DEVICE

(75) Inventors: Helmut Nast, Berlin (DE); Raimo Jacobi, Berlin (DE)

(73) Assignee: Funkwerk Dabendorf GmbH, Dabendorf (DE)

( * ) Notice: Subject to any disclaimer, the term of this patent is extended or adjusted under 35 U.S.C. 154(b) by 454 days.

(21) Appl. No.: 10/472,617

(22) PCT Filed: Mar. 21, 2002

(86) PCT No.: PCT/DE02/01076

§ 371 (c)(1),
(2), (4) Date: Sep. 22, 2003

(87) PCT Pub. No.: WO02/078202

PCT Pub. Date: Oct. 3, 2002

(65) Prior Publication Data

US 2004/0147230 A1     Jul. 29, 2004

(30) Foreign Application Priority Data

Mar. 21, 2001   (DE) ................. 101 14 532

(51) Int. Cl.
*H04B 1/04*         (2006.01)
(52) U.S. Cl. ............. 455/129; 455/121; 455/168.1
(58) Field of Classification Search ........... 455/129, 455/121, 562.2, 180.1, 188.1, 193.1, 192.1, 455/168.1
See application file for complete search history.

(56) References Cited

U.S. PATENT DOCUMENTS 5,881,369 A * 3/1999 Dean et al. .................. 455/78

FOREIGN PATENT DOCUMENTS

DE            195 36 640 A1    3/1997

(Continued)

OTHER PUBLICATIONS

AMPLIFIER mod. VUR 30, Fa. MICROSET; Schaltbilder.

*Primary Examiner*—Duc Nguyen
*Assistant Examiner*—Eric J Elcenko
(74) *Attorney, Agent, or Firm*—Kriegsman & Kriegsman

(57) ABSTRACT

The invention concerns a circuit arrangement for compensation of attenuation in an antenna lead for a mobile wireless device.

The circuit arrangement is suitable for operation in a wireless network, in which the higher or the lower of two frequency ranges defined in one frequency band is used selectively for transmitting and the other frequency range is used for receiving the wireless signals within the one frequency band. It comprises in a corresponding circuit component at least one signal pathway with a power amplifier which is designed as broadband and this pathway is configured for amplifying HF signals to be transmitted; one signal pathway with a low-noise amplifier which is also designed as broadband and this pathway is configured for amplifying HF signals which are received; two filtering and reverse-switching units, each with a frequency filter and a signal-reversing switch on the input and output sides of the two signal pathways of this circuit component; as well as a detection and control unit controlling the signal-reversing switches.

HF signals that are received are conducted in the base state of the circuit component provided for the transmission of the respective frequency range, independently of whether they belong to the higher or lower frequency range of the frequency band, always over the low-noise amplifier.

5 Claims, 5 Drawing Sheets

FOREIGN PATENT DOCUMENTS

| | | |
|---|---|---|
| DE | 199 13 064 C1 | 1/2001 |
| DE | 199 60 299 A1 | 6/2001 |
| EP | 0 684 707 A1 | 11/1995 |
| EP | 1 039 650 A2 | 9/2000 |
| GB | 2 176 079 A | 12/1986 |
| JP | 09092785 A | 4/1997 |

* cited by examiner

CIRCUIT ARRANGEMENT FOR COMPENSATION OF THE DAMPING IN AN ANTENNA FEED CABLE FOR A MOBILE RADIO DEVICE

BACKGROUND OF THE INVENTION

The invention concerns a circuit arrangement for compensation of attenuation in an antenna lead for a mobile wireless device.

For example, in motor vehicles, mobile wireless devices are operated with an antenna arranged externally on the vehicle, due to the shielding effect of the automobile body. The mobile wireless device, for example, a mobile telephone held by a hands-free device is connected with the external antenna via an antenna lead (HF cable) for this purpose. Even if the reception and the possibilities of transmission are clearly improved by the use of external antennas when compared to operation without external antennas, it can be viewed as a disadvantage that the signals that are transmitted and received are subject to attenuation in the antenna lead. Therefore, according to solutions that have become known in practice, the antenna lead is guided via special circuit arrangements accommodated between the mobile wireless device and the external antenna for compensation of the attenuation occurring in the antenna lead. Such a circuit arrangement is described, for example, in DE 195-36,640. Since different frequency ranges are used in the mobile wireless device for uncoupling signals that are transmitted and received within one frequency band which is used for transmission and reception, and for an optimal compensation of the occurring attenuation, the circuit arrangement presented in the document provides separate signal pathways for transmitted and received signals. Each time depending on whether an HF signal is received or transmitted by the mobile wireless device, either the transmission or reception pathway is activated by a special HF reversing switch, so that the signal is guided either over a power or transmission amplifier or over a special reception or low-noise amplifier.

Another solution has become known through DE 199-13,064. The compensation circuit described in this document is designed for dual-band operation. It thus provides frequency band filters on the input and output sides, by means of which, the HF signals are introduced into the circuit component provided for the respective frequency band. Depending on a transmission signal recognized by a detection circuit, by means of a special circuit arrangement, the transmission amplifier is turned on for the respective frequency band and the appropriate signal pathway is activated. Developments, in which advantages that are known, among other things, for improved utilization of frequency bands and for profiting from the different mobile wireless systems existing at the present time, have recently occurred, and more flexible transmission methods will be achieved in future mobile wireless systems. Thus, for example, the frequency ranges provided for transmitting and receiving can be alternated within one frequency band, unlike what is known from GSM networks. In addition, transmission may occur selectively in an existing telecommunications connection, controlled by time slots, or as a continuous wave (continuous transmission without dividing into time slots).

SUMMARY OF THE INVENTION

The object of the present invention is thus to create a circuit arrangement for compensation of attenuation in an antenna lead, which permits a more flexible operation relative to these developments and automatically is adjusted to the transmission mode selected each time for a telecommunications connection.

The object is solved by a circuit arrangement with the features of the principal claim. Advantageous configurations or enhancements of the circuit arrangement according to the invention are given by the subclaims.

The circuit arrangement characterized by the features of the principal claim is suitable for operation in a wireless network, in which, depending on the requirements of the network and devices that participate in a telecommunications connection, the higher or the lower of two frequency ranges defined in one frequency band is used for transmitting and the other frequency range is used for receiving the wireless signals within the frequency band. To this end, the circuit arrangement comprises, in a circuit component provided for operation in this frequency band, at least one signal pathway with a power amplifier which is designed as broadband and this pathway is configured for amplifying HF signals to be transmitted, one signal pathway with a low-noise amplifier which is also designed as broadband and this pathway is configured for amplifying HF signals which are received, two filtering and reverse-switching units, each with a frequency filter and a signal-reversing switch on the input and output sides of the two signal pathways of this circuit component, as well as a detection and control unit controlling the signal-reversing switch. Starting from a base state, this unit automatically assumes the operating states given in advance by the mobile wireless device, whereby the transmitting of HF signals is possible in either the higher or the lower of the two frequency ranges situated in the frequency band. This is achieved by guiding the HF signals that are received in the base state of the circuit component provided for the transmission of the respective frequency range, independently of whether they belong to the higher or lower frequency range of the frequency band, always over the low-noise amplifier. Conditioned only by the mobile wireless device and an HF transmission signal that is transmitted by it, the signal-reversing switches are controlled by means of the detection and control unit that establishes the presence of the transmission signal, such that HF signals with a frequency within the frequency range used for transmission in the scope of the actually established telecommunications connection are guided over the power or transmission amplifier.

According to one possible configuration of the invention, in the absence of a transmission signal from the mobile wireless device, the detection and control unit reverses the signal-reversing switch directly into the switching state that corresponds to the base state of the circuit component for the corresponding frequency band. Here, it would also be basically conceivable that the switching back to the base state occurs only after terminating the previously established telecommunications connection. Of course, additional circuit units would be required for this, by which the termination of the connection is recognized. Also, however, with respect to the desired flexibility for use in the mode that is controlled by time slots or in the continuous-wave mode, preference is to be given to that variant of the above-described variants, in which a resetting to the base state occurs each time directly after the absence of transmission signals. According to a particularly advantageous further configuration of the circuit arrangement, another control connection is also provided between the detection and control unit and the power amplifier. The power amplifier can be activated or disconnected by means of this control connection, so that its activation occurs only in the presence of a transmission signal (within the frequency band processed by the circuit component). This is particularly advantageous with respect to the high power consumption of the power amplifier. This variant also makes it possible, according to an enhancement, to variably adjust the amplification of the power amplifier by means of the detection and control unit as a function of the frequency range used for the transmission.

According to a particularly advantageous embodiment of the invention, the circuit arrangement provides additional circuit components that make operation possible in other frequency bands (dual-band or multi-band operation), each of which has a transmitting and receiving pathway and is thus capable of dual or multiple bands. Thus, the circuit components assigned to the individual frequency bands, are separate from one another relative to HF, if need be, by frequency band separators or filters, so-called diplexers.

BRIEF DESCRIPTION OF THE DRAWINGS

The invention will be explained in more detail below on the basis of an embodiment example. Individually, the figures show:

FIG. 4: The detail of the circuit component A according to FIG. 3 in a switching state for transmission in frequency range a;

DETAILED DESCRIPTION OF THE INVENTION

Figure 1:
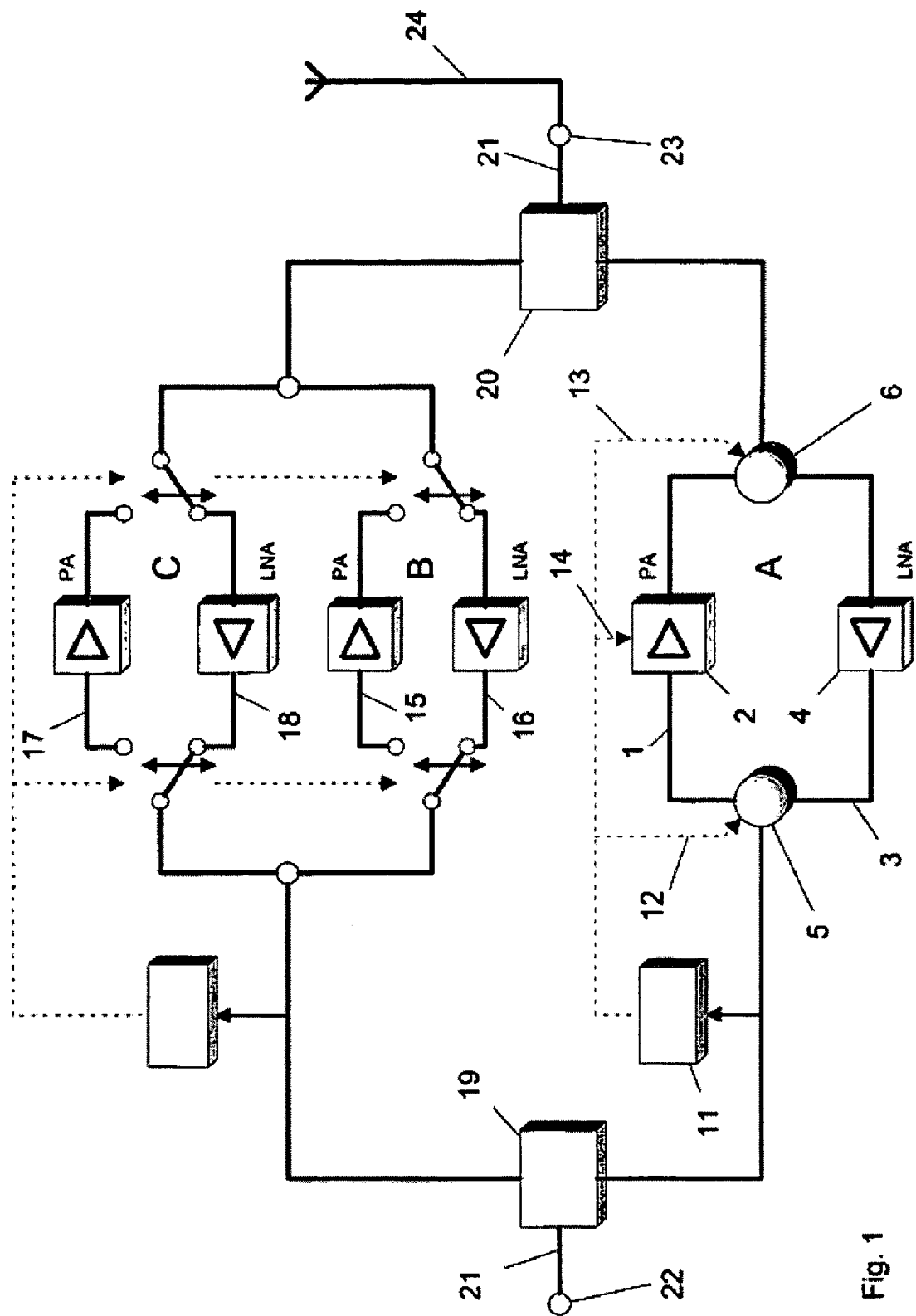
FIG. 1: An embodiment of the circuit arrangement according to the invention for a multi-band operation.

The circuit arrangement according to the invention is shown in FIG. 1 in a configuration with multi-band capacity. In the example shown, the circuit arrangement makes possible the compensation of attenuation for operation in three different frequency bands. The circuit arrangement provides a device-side connection 22 and an antenna pick-up 23. The signal is introduced into the circuit component A, B or C, which is designed for the respective frequency band, by the frequency band filters 19, 20, so-called diplexers, which are present on both the device and the antenna sides. The circuit components B and C are designed for operation in different frequency bands, but with frequency ranges clearly established within these frequency bands, for transmitting and receiving (for example, GSM 900 and GSM 1,800). In contrast, the circuit component A is designed in a way following the principle of the invention. In this circuit component A, both the power amplifier 2 (PA) as well as the low-noise amplifier 4 (LNA) are designed as broadband, so that within the frequency band provided for processing this circuit component A, both transmission signals in a higher frequency range a, b, when compared with the signals which are received, as well as transmission signals in a lower frequency range b, a, relative to the signals that are received, can be transmitted to antenna 24 by the mobile wireless device connected to connection 22, which is not shown in the figure. The functioning of this circuit component A will be explained below.

Two different frequency ranges a (for example, 1,900 to 1,980 MHz) and b (for example, 2,010 to 2,170 MHz) are provided for transmitting and receiving within one frequency band. Alternatively, an HF signal entering antenna 24 can have frequencies within the higher or the lower frequency range a, b permitted in the frequency band. One such signal is first introduced into circuit component A via antenna pick-up 23 and diplexer 20. The latter component is found in a base position, in which, independent of whether the signal that is received involves a signal in the frequency range a or b, this incoming signal is introduced into the mobile wireless device, which is not shown, based on a corresponding switching state of the filtering and reverse-switching units 5, 6, over low-noise amplifier 4 and the other diplexer 19 as well as connection 22. The mobile wireless device, which is, of course, suitable for operation in the corresponding network standard, recognizes whether the received signal has frequencies within the frequency range a, in this example, 1,900 to 1,980 MHz or b, in this example, 2,010 to 2,170 MHz. Correspondingly, a signal to be transmitted is produced by the mobile wireless device corresponding to the other frequency range each time. If the received signal thus has, for example, a frequency between 2,010 and 2,170 MHz, then the mobile wireless device transmits in the frequency range of 1,900 to 1,980 MHz in the scope of the present connection.

As soon as the detection and control unit 11 determines such a transmission signal between 1,900 und 1,980 MHz, coming from the mobile wireless device connected to the switching unit, it controls the filtering and reverse-switching units (5, 6) via the control connections 12, 13, so that signals within this frequency range a or b are always conducted via signal pathway 1 with power amplifier 2. The configuration of the filtering and reverse-switching units 5, 6 is explained in more detail in the following figures. According to an advantageous embodiment, there is also a control connection 14 between the detection and control unit 11 and the power amplifier 2 in the circuit arrangement shown in FIG. 1. For purposes of reducing the power consumption of the entire switching unit, the power amplifier 2 is only activated if the presence of a transmission signal to be transmitted via the circuit component A is established by the detection and control unit 11. Otherwise, the power amplifier 2 is inactive.

Figure 2:
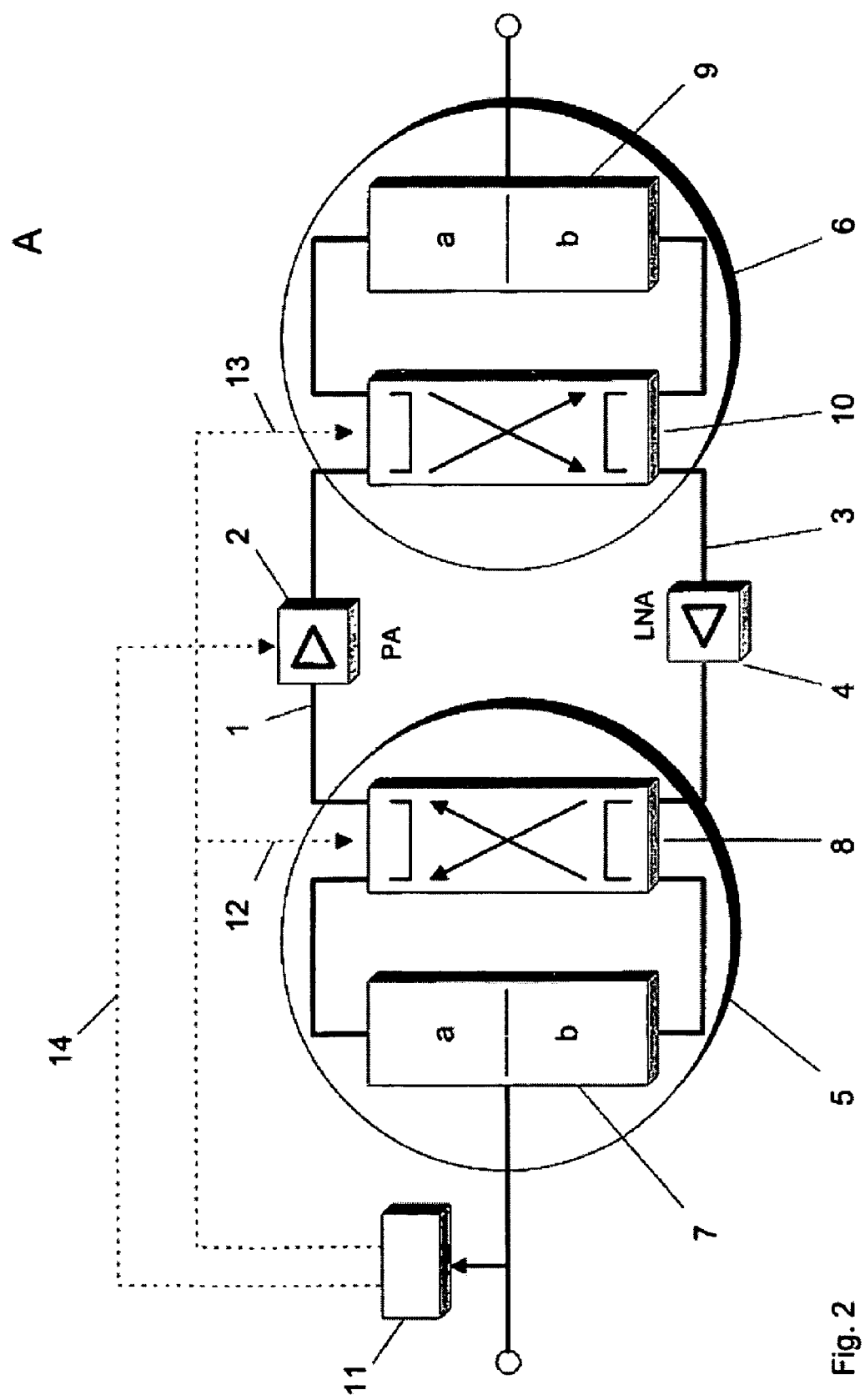
FIG. 2: The circuit component A of the circuit arrangement, for selective transmission in a higher or a lower frequency range within the frequency band transmitted by this circuit component.
Figure 3:
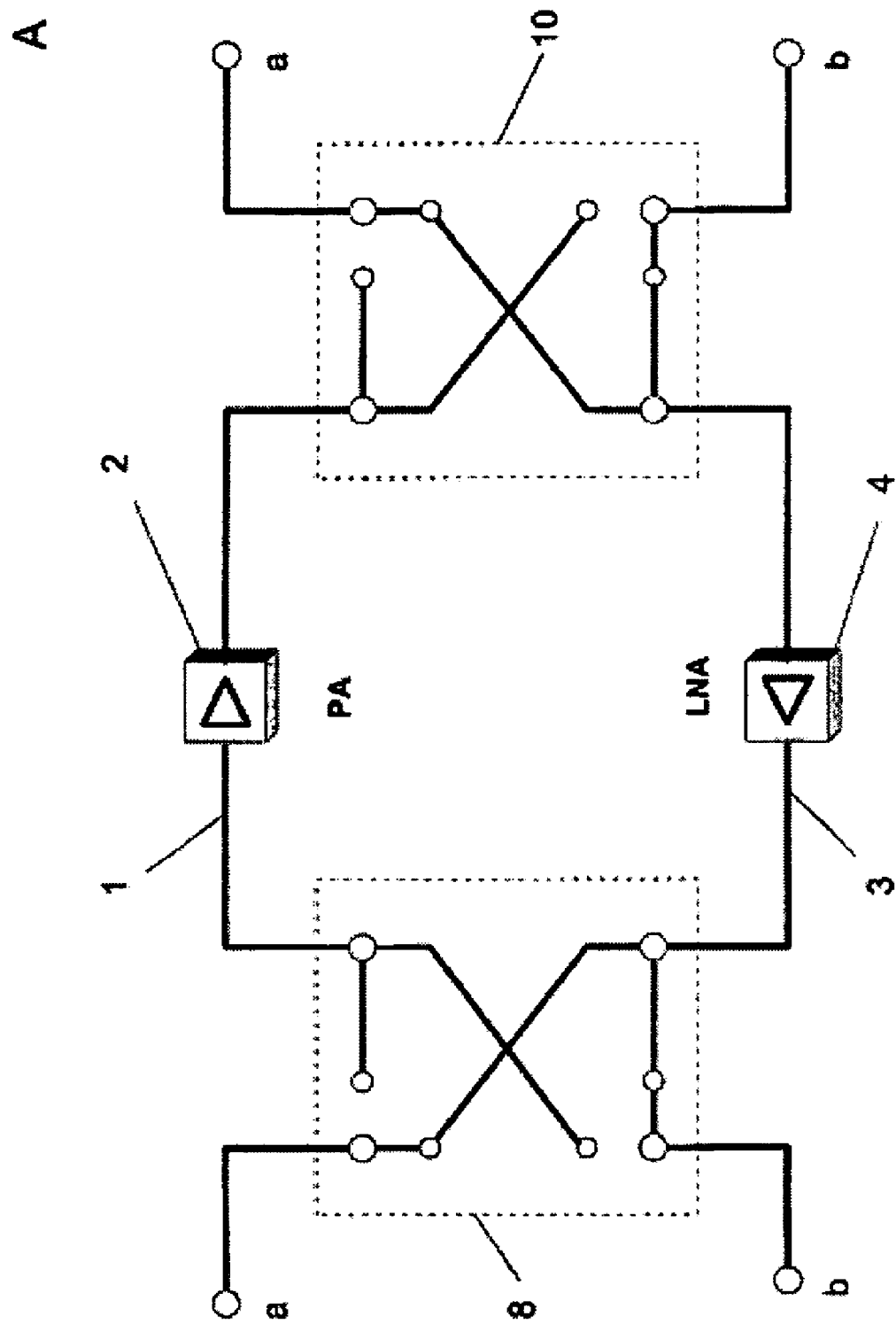
FIG. 3: A detail of the circuit component A according to FIG. 2 in the base state.

FIG. 2 illustrates the formation of the filtering and control units 5, 6 in more detail. As is shown in the figure, these units each involve a combination of one of the frequency filters 7, 9 with one of the signal-reversing switches 8, 10 for the switching back and forth of the signal pathway adapted to the respective mode of operation. The transmission signal coming from the mobile wireless device is introduced into the frequency pathway for the frequency range a or b by the frequency filter 7. The detection and control unit 11, which recognizes whether the transmission signal belongs to the frequency range a or b of the frequency band processed by the circuit component A, switches the signal-reversing switches 8, 10 by means of the control connections 12, 13 that exist for these, so that the transmission signal is conducted via signal pathway 1 with power amplifier 2 and antenna pick-up 23 of antenna 24. The power amplifier 2 is actively switched on also only if the detection and control unit 11 recognizes a corresponding transmission signal. In the absence of the transmission signal, the transmission amplifier 2 is deactivated and the signal-reversing switches 8, 10 are switched to a base state by the detection and control unit 11. This base state is shown in FIG. 3, which illustrates once more the special features of the signal-reversing switches 8, 10. If the base state is present, a received signal corresponding to the frequency band of the circuit component A is conducted via the signal pathway 3 to the low-noise amplifier 4, independent of whether it has a frequency in the frequency range a or b, and from there is further conducted to the mobile wireless device, which is not shown, by the signal-reversing switch 8, the frequency filter (duplexer 7), diplexer 19 and connection 22. A transmission operation is not possible in this switching state. The latter is possible only if a corresponding transmission signal which is given by the mobile wireless device is detected by the detection and control unit 11. Only then is the power amplifier 2 activated, on the one hand, and, on the other hand, the signal-reversing switch 8, 10 by a corresponding control, which switches on signal pathway 1 conducting over transmission amplifier 2.

Figure 4:
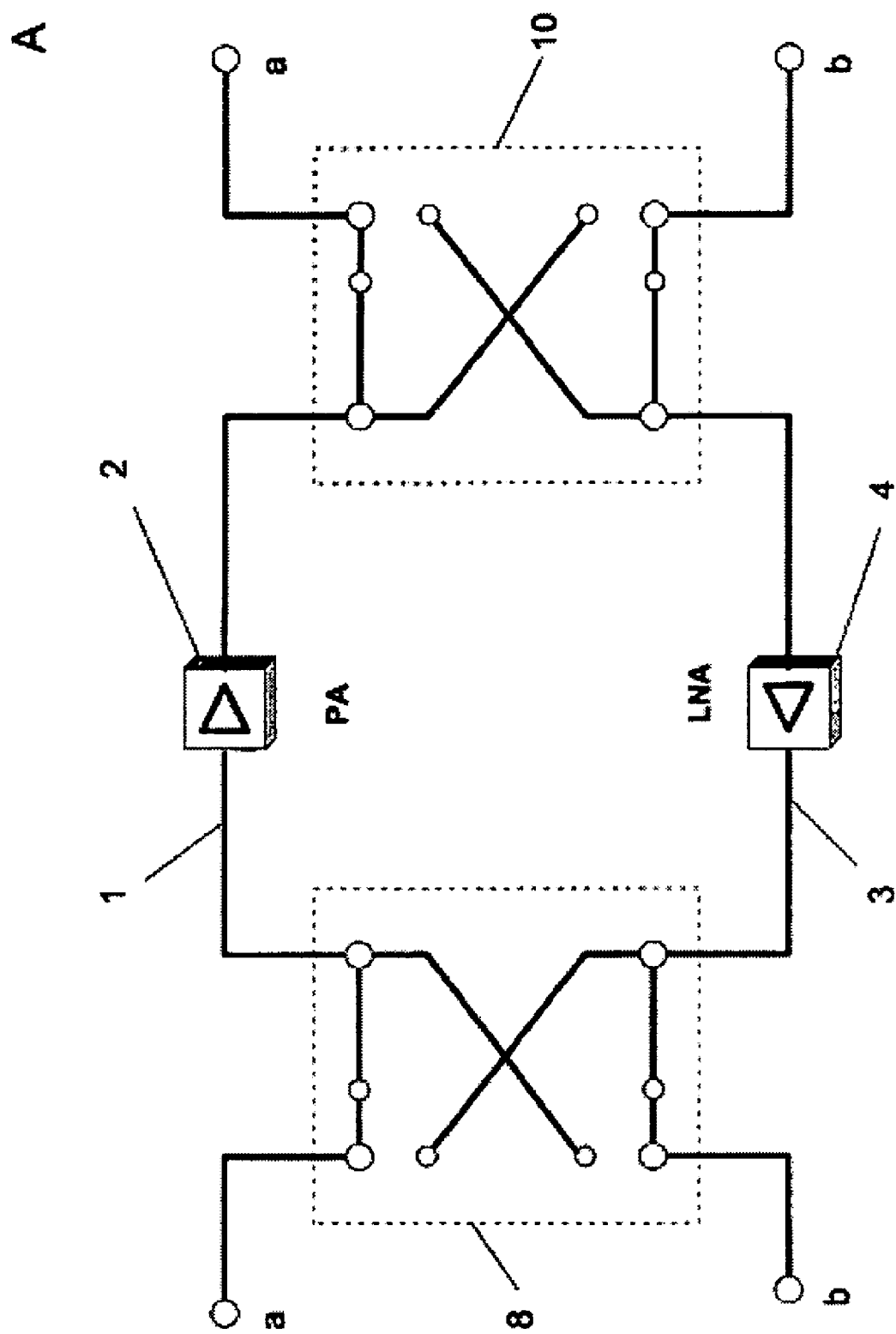

In FIG. 4, after appropriate control by means of the detection and control unit 11, the signal-reversing switches 8, 10 have a switching state, in which a transmission signal lying in the frequency range a (thus between 1,900 and 1,980 MHz according to the example) is guided over transmission amplifier 2. Provided that the circuit is operated in the continuous-wave mode, and a true duplex connection thus exists with simultaneous transmitting and receiving, the received signal to be assigned to frequency range b (2,010 to 2,170 MHz) is simultaneously exclusively conducted over low-noise amplifier 4. As soon as the detection and control unit 11 no longer recognizes a transmission signal, circuit component A again assumes the base state according to FIG. 3.

Figure 5:
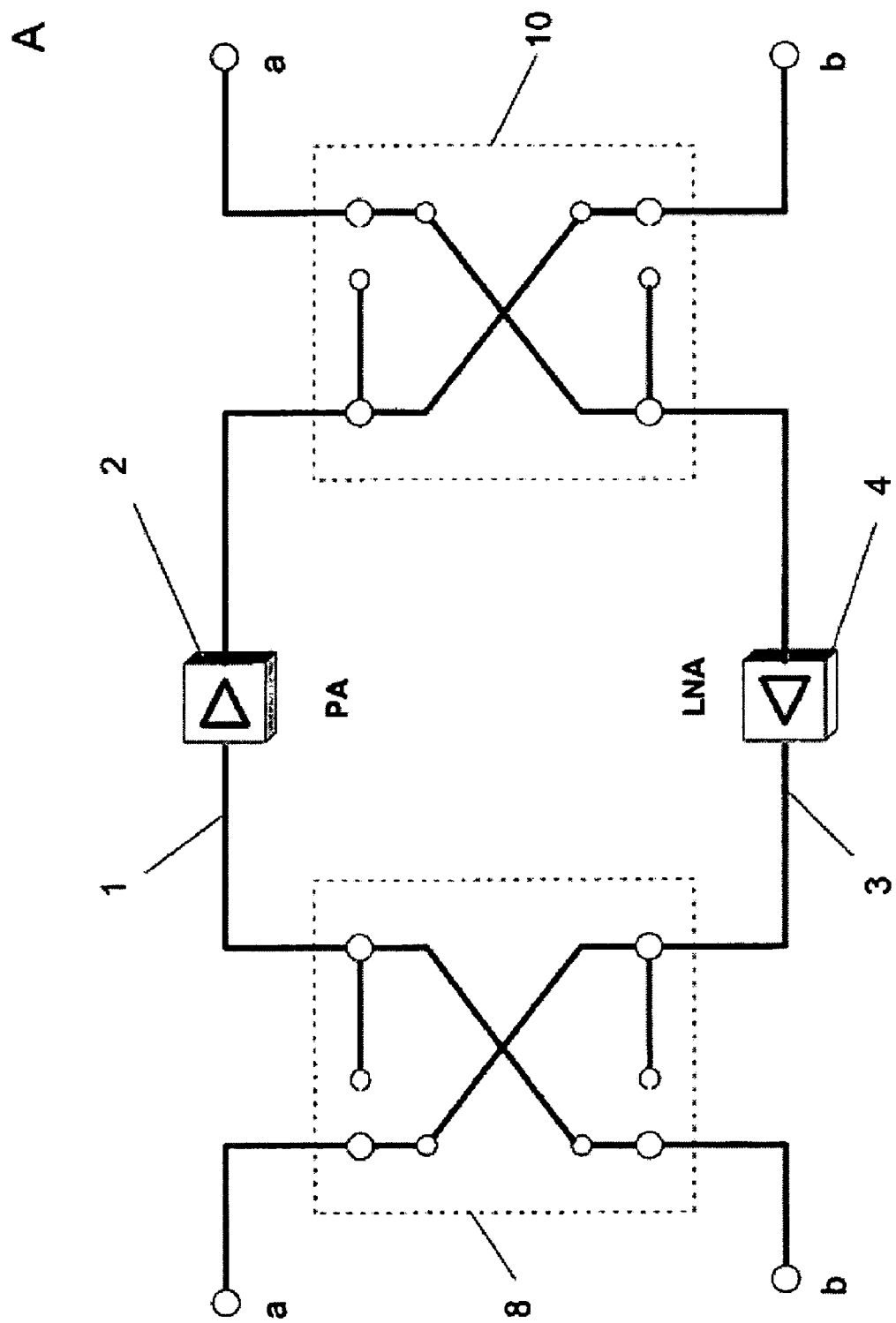
FIG. 5: The detail of the circuit component A according to FIG. 3 in a switching state for transmission in frequency range b.

FIG. 5 shows the circuit component A once more in a switching state with the transmission signal present. Of course, it was established here by the detection and control unit 11, that the transmission signal has frequencies in the frequency range b (2,010 to 2,170 MHz). Consequently, the signal-reversing switches were switched on here via the control connection, so that signals of the frequency range b are guided via the transmission amplifier, whereas received signals of the frequency range a (1,900 and 1,980 MHz) are guided from the antenna via the low-noise amplifier to the mobile wireless device.

LIST OF REFERENCE CHARACTERS USED

1 Signal pathway (transmission pathway)
2 Power or transmission amplifier
3 Low-noise amplifier
4 Signal pathway (receiving pathway)
5 Filtering and reverse-switching unit
6 Filtering and reverse-switching unit
7 Frequency filter (duplexer)
8 Signal-reversing switch
9 Frequency filter (duplexer)
10 Signal-reversing switch
11 Detection and control unit
12 Control connection
13 Control connection
14 Control connection
15 Transmission pathway
16 Receiving pathway
17 Transmission pathway
18 Receiving pathway
19 Frequency band filter (diplexer)
20 Frequency band filter (diplexer)
21, 21'Antenna lead
22 (Device-side) connection
23 Antenna pick-up
24 Antenna
A Circuit component
B, C Circuit component
a, b Frequency range

The invention claimed is:

1. Circuit arrangement for compensation of attenuation in an antenna lead (21, 21') for a mobile wireless device, which has at least one circuit component (A), which is suitable for operation in a first frequency band with two different frequency ranges (a, b) of HF signals for transmitting and receiving, and for this purpose comprises at least one signal pathway (1) (transmitting pathway) with a power amplifier (2) which is designed as broadband and this pathway is configured for amplifying HF signals to be transmitted; one signal pathway (3) (receiving pathway) with a low-noise amplifier (4), which is designed as broadband and this pathway is configured for amplifying HF signals which are received; two filtering and reverse-switching units (5, 6), each with a frequency filter (7, 9) and a signal-reversing switch (8, 10) on the input and output sides of the two signal pathways (1, 3); as well as a detection and control unit (11) controlling the signal-reversing switches (8, 10), whereby, corresponding to possible different operating states given beforehand and automatically assumed by the mobile wireless device and starting from a base state of circuit component A of the circuit arrangement, the transmission of the HF signals is possible either in the higher or the lower of both frequency ranges (a, b) located in the frequency band processed by circuit component A, by conducting the HF signals that are received via the circuit component (A) in the base state via signal pathway (3) with low-noise amplifier (4), independently of whether they belong to frequency range (a, b) within the frequency band processed by circuit component (A) and conditioned by the mobile wireless device and an HF signal that is transmitted by it, by means of the detection and control unit (11) that establishes the presence of the transmission signal, the signal-reversing switches (8, 10) are controlled in such a way via control connections (12, 13) that HF signals with a frequency within the frequency range (a) or (b) used in the scope of the actually established telecommunications connection for transmission are conducted over power amplifier (2) of the circuit component (A).

2. The circuit arrangement according to claim 1, further characterized in that the detection and control unit (11) directly switches back the signal-reversing switches (8, 10) into the switching state corresponding to the base state of circuit component (A) when a transmission signal is absent from the mobile wireless device.

3. The circuit arrangement according to claim 1 or 2, further characterized in that another control connection (14) is present from the detection and control unit (11) to the power amplifier (2) and this connection actively controls the power amplifier (2), so that it is actively switched on only when a transmission signal is present.

4. The circuit arrangement according to claim 3, further characterized in that the amplification of the power amplifier (2) is variably adjusted by means of the detection and control unit (11) as a function of the frequency range (a, b) used for transmission in the currently existing telecommunications connection.

5. The circuit arrangement according to one of claims 1 to 4, further characterized in that the circuit arrangement for a dual-band or multi-band operation, along with circuit component (A), has additional circuit components (B, C) for processing wireless signals of other frequency bands, each with a transmitting pathway (15, 17) and a receiving pathway (16, 18), whereby the circuit components (A, B, C) assigned to the individual frequency bands are separate from one another relative to HF, if need be, by frequency band filters (diplexers) (19, 20).

\* \* \* \* \*